United States Patent [19]

Yamaguchi et al.

[11] Patent Number: 4,958,379
[45] Date of Patent: Sep. 18, 1990

[54] OPTICAL CHARACTER READER FOR OUTPUTTING A CHARACTER FROM COMBINATIONS OF POSSIBLE REPRESENTATIONS OF THE CHARACTER

[75] Inventors: Mikio Yamaguchi; Naoki Maeda, both of Osaka, Japan

[73] Assignee: Sumitomo Electric Industries, Ltd., Osaka, Japan

[21] Appl. No.: 292,930

[22] Filed: Jan. 3, 1989

[30] Foreign Application Priority Data

Jan. 4, 1988 [JP] Japan .................................. 63-531

[51] Int. Cl.$^5$ .............................................. G06K 9/22
[52] U.S. Cl. ..................................... 382/59; 382/57; 382/9; 382/39
[58] Field of Search ..................... 382/59, 57, 62, 51, 382/17, 39, 40, 60, 38, 30

[56] References Cited

U.S. PATENT DOCUMENTS

| | | | |
|---|---|---|---|
| 4,589,142 | 5/1986 | Bednar | 382/39 |
| 4,654,873 | 3/1987 | Fujisawa et al. | 382/9 |
| 4,817,185 | 3/1989 | Yamaguchi et al. | 382/59 |

FOREIGN PATENT DOCUMENTS 55-9223  1/1980  Japan .

Primary Examiner—David K. Moore
Assistant Examiner—Michael Razavi
Attorney, Agent, or Firm—Cushman, Darby & Cushman

[57] ABSTRACT

An apparatus and method for determining a character read by an optical character reader during a plurality of scans, whereby the character is determined from the plurality of scans by taking into consideration the tendency that the character will be misread as a second character. If there is no possibility that the second character could be interpreted as a misreading of the character which is read by the optical character reader, a "REJECT" or error signal may be generated, thus improving the reliability of determined characters.

10 Claims, 5 Drawing Sheets

OPTICAL CHARACTER READER FOR OUTPUTTING A CHARACTER FROM COMBINATIONS OF POSSIBLE REPRESENTATIONS OF THE CHARACTER

BACKGROUND OF THE INVENTION

1. Field of the Invention

The present invention relates to an optical character reader, and particularly relates to an optical character reader for reading characters written on a sheet of paper while the sheet and an image sensor are moved relative to each other, for example, a hand-held optical character reader for reading characters written on a price label by putting a scanner against the price label by hand.

2. Description of the Prior Art

Conventionally, an optical character reading apparatus has been used to scan an image sensor repeatedly to carry out character recognition with respect to one and the same character so as to improve recognition performance. See, for example, Japanese Pat. Application (unexamined) Publication No. 55-9223.

FIG. 1 (PRIOR ART) shows a prior art optical character reading apparatus. Reading is carried out by placing a scanner 1 above a paper sheet 2 to be read. Characters written on paper 2 are irradiated by light sources 3 and imaged onto image sensor 5 through optical system 4. Image sensor 5 is scanned so that the character image is converted into an electric signal which in turn is converted into a black-and-white picture by a binary encoding circuit 6. A character recognition arrangement 7 recognizes the character and the result of recognition is stored in a storage device 8. According to this prior art device, image sensor 5 may have a size of one character or a size of one line. Character recognition is repeatedly performed by scanning with image sensor 5, and the results of recognition are successively stored in storage device 8. The result of recognition stored in the storage device 8 is then subjected to a decision by a "majority" device 9 to determine a final result 12.

The results of recognition in the optical character reading apparatus may be classified into three cases: a first case in which character recognition has been performed correctly (correct reading); a second case in which character recognition has been performed erroneously (erroneous reading); and a third case in which character recognition has been impossible (reject). The tendency of erroneous reading is different depending on the kind of characters, and the majority processing in the optical character reading apparatus in the prior art has failed to consider this varying tendency of erroneous reading.

Referring to FIGS. 2(a), 2(b) and 2(c), the tendency of erroneous reading in the prior art will be described. FIG. 2(a) shows the tendency of erroneous reading in the case of a character of "T". The character "T" designated by $a_1$ may be shortened at its lateral bar by binary encoding circuit 6 so that the character "T" designated by a1 is often transformed into such a form as shown by $a_2$ or $a_3$. The forms designated by $a_2$ and $a_3$ may be erroneously read as "7" and "1", respectively, by character recognition arrangement 7.

FIG. 2(b) shows the tendency of erroneous reading in the case of a character of "7". If the lateral bar portion of the character "7" designated by $b_1$ is shortened, the character "7" may be erroneously read as "1". However, the lateral bar is never elongated in accordance with the characteristic of the binary encoding circuit 6, and the character "7" never becomes such a picture as designated by $b_3$. Accordingly, the character "7" is never erroneously read as "T".

FIG. 2(c) shows the tendency of erroneous reading in the case of a character "1". The lateral bar portion of the character "1" is never elongated, so that the character "1" is never erroneously read as "7" designated by $c_2$ or "T" designated by $c_3$.

Thus, the tendency of the erroneous reading depends on the kind of characters.

Since the kind of characters have not been taken into consideration on the decision by majority means in the prior art optical character reading apparatus, there occurs impropriety as shown in the following Table 1.

TABLE 1

| | Improper Decision by Majority in the Prior Art | | |
|---|---|---|---|
| Serial No. | Combination of recognition result | | Final result |
| A | 7 | 7 | T | 7 |
| B | 1 | 1 | T | 1 |
| C | 1 | 1 | 7 | 1 |

Serial number A shows a combination of results of recognition result 7,7, and T when recognition was performed on three figures. According to the conventional decision by majority, the character has been determined to be "7" as the final result. However, the character "7" can never be erroneously read as "T" as shown in FIG. 2(b). On the contrary, in consideration that "T" may be erroneously read as "7", the proper interpretation in serial number A should be that "T" has been correctly read. Similarly, in the case of serial number B, the proper interpretation in consideration of the fact that "1" can never be erroneously read as "T" is that "T" was properly read and "1" was misread. Therefore, in the majority processing in the prior art optical character reading apparatus, the tendency of such erroneous reading depending on the kind of characters has not been taken into consideration, so that the final result has frequently been incorrect.

SUMMARY OF THE INVENTION

The present invention solves the recognition problems described above.

An object of the present invention is to provide a method and apparatus for determining a final result from a plurality of combinations of recognition results, whereby the combinations are predetermined by an analysis taking into consideration the tendency of erroneous reading: if there are any elements in a given combination that are not equivalent to the corresponding final result, such elements will have nevertheless satisfied the condition that there exists a possibility that the final result could be erroneously read as those non-equivalent elements.

A method of decision by majority in which the tendency of erroneous reading is taken into consideration is shown in Table 2(a) and 2(b). For example, Table 2(a) shows the tendency of erroneous reading such that the character "T" is apt to be erroneously read as "7" or "1" and the character "7" is apt to be erroneously read as "1".

TABLE 2(a)

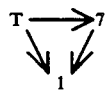

TABLE 2(b)

| Serial No. | Combination of recognition result | | | Final result |
|---|---|---|---|---|
| A | T | T | T | T |
| B | T | T | 7 | T |
| C | T | T | 1 | T |
| D | T | T | ? | T |
| E | 7 | 7 | 7 | 7 |
| F | 7 | 7 | 1 | 7 |
| G | 7 | 7 | ? | 7 |
| H | 1 | 1 | 1 | 1 |
| I | 1 | 1 | ? | 1 |

Table 2(b) shows a method of decision by majority in which the tendency of erroneous reading is taken into consideration. In Table 2(b), the combinations shown in the Table 1 are omitted from the set of all possible combinations from which final results are determined through the conventional decision by majority because of the unlikely tendency of a first character being misread as a second character. For example, a combination "T", "T", and "7" is found in the serial number B in the Table 2(b) and therefore the final result would be determined in the conventional case to be "T". However, the combination "7", "7", and "T" is omitted from Table 2(b) after considering that it is unlikely a "7" will be misread as a "T"; since a combination "7", "7", and "T" is not in Table 2(b), this combination would be rejected. Similarly, Table 2 (b) does not include the combination "1", "1", "7" or "1", "1", "T" because it is unlikely that "1" could be erroneously read as "7" or "T"; since neither combination is found in Table 2(b), the reading of such a combination by the optical scanner would be rejected thus generating, for example, an error signal. Thus, by taking into consideration the tendency of erroneous reading, the erroneous reading of characters is reduced, and the reliability of recognition results which are determined by the method of decision by majority is greatly improved.

The present invention further provides for the occurrence of unknown characters which are not recognized by the character recognition means, for example, the occurrence of a hardware failure, or the reading of poor quality paper. Table 2(b) includes combinations having the symbol "?", which denotes an unknown character which was not recognized by the character recognition means. In Table 2(b), for example, the tendency of erroneous reading has been taken into consideration by the conclusion that the occurrence of a single unrecognizable character may result in a majority result. For example, the combination "1", "1", "?" is found in Table 2(b) with the Final result being 1, because it is probable that an unrecognizable occurrence may occasionally occur; however, the result "1", "1", "7" is not found because it is unlikely that "1" would be erroneously read as "7".

Thus, the present invention provides useful and reliable means for determining a final result from a plurality of combinations of recognition results by taking into consideration the tendency of erroneous reading.

DETAILED DESCRIPTION OF THE PREFERRED EMBODIMENTS

Figure 1:
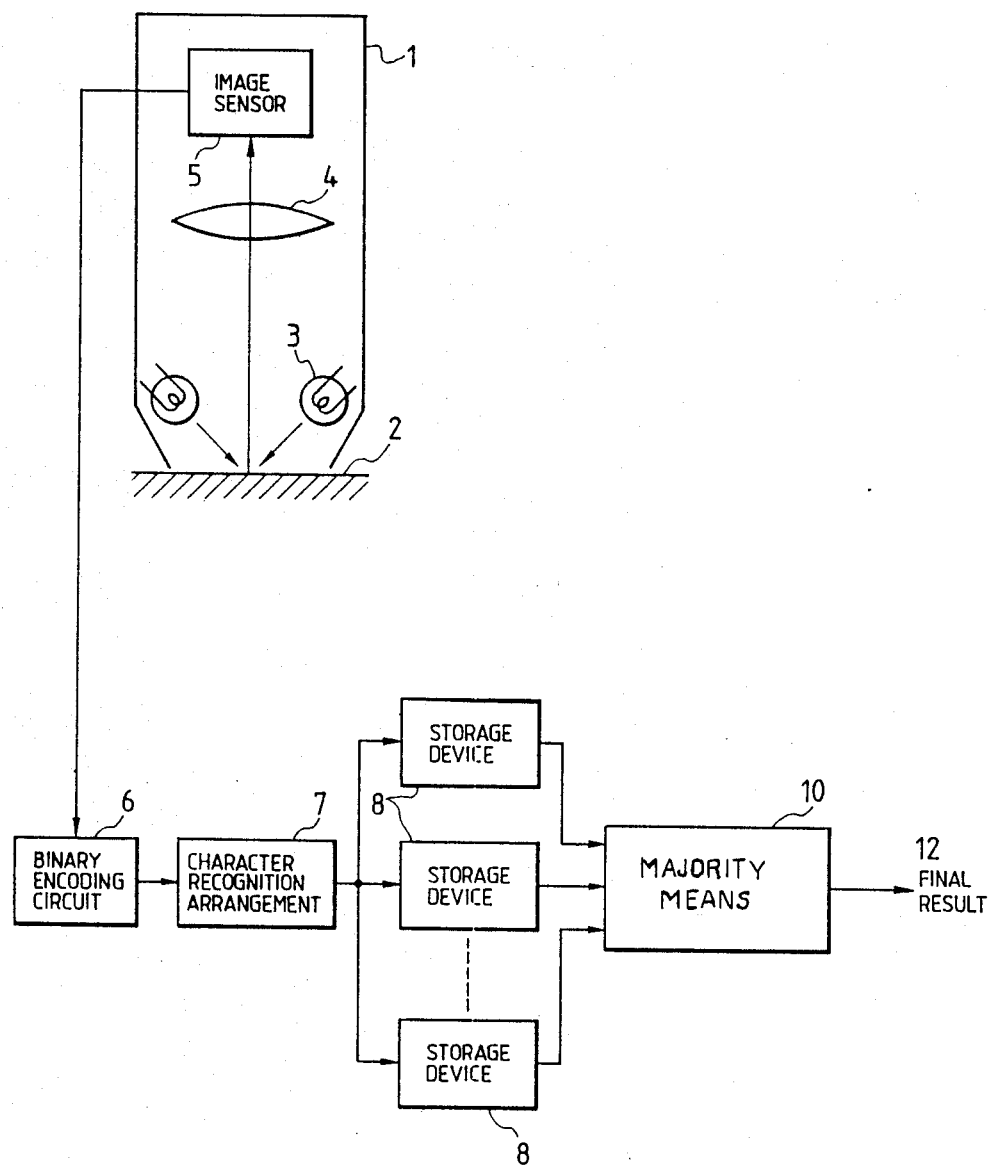
FIG. 1 a block diagram of an optical character reading apparatus as disclosed by the prior art.
Figure 2A:
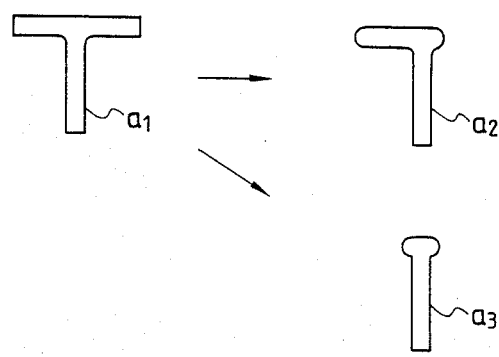
FIGS. 2a, 2b and 2c describe the erroneous reading of characters by the prior art apparatus described in FIG. 1.
Figure 2B:
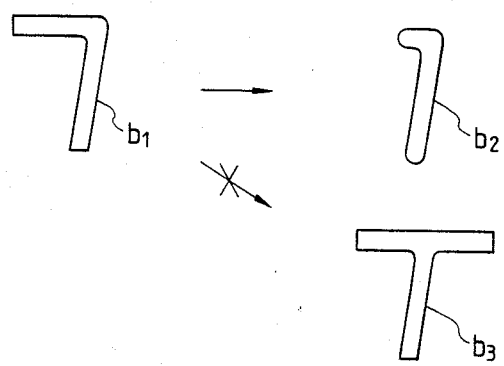
Figure 2C:
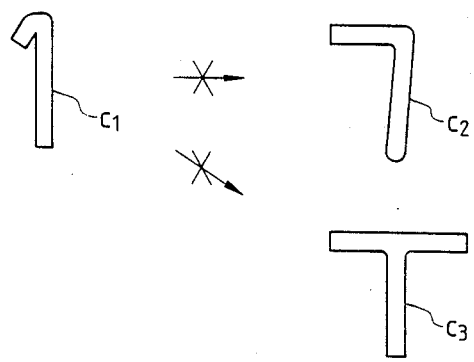
Figure 3:
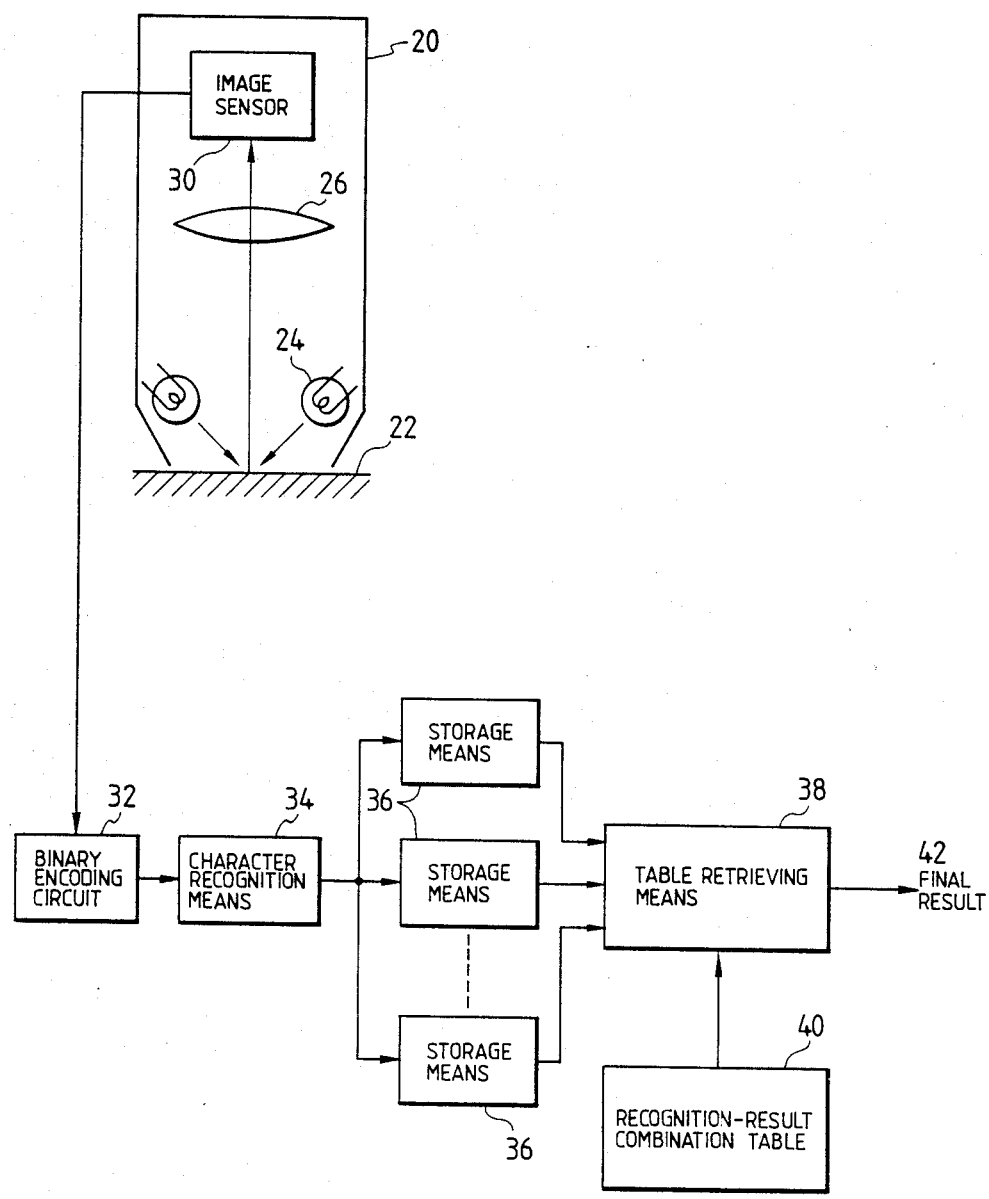
FIG. 3 is a block diagram of the present invention.

FIG. 3 describes the operation of the present invention in scanning characters. Scanner 20 scans surface 22, for example a paper or transparency, which has characters written thereon. Light sources 24 illuminate surface 22 and the characters written thereon, and optical system 26 directs the light from surface 22 to image sensor 30. Image sensor 30 produces an analog signal representing the character image scanned from surface 22. The analog output signal of image sensor 30 is converted by binary encoding circuit 32 into a digital signal, representing white and black intensity within the character image.

The digital signal is then input into character recognition means 34, for example a look-up table in a ROM circuit or a decoder, which determines if there is a recognized character corresponding to the digital signal: if character recognition means 34 recognizes the digital signal as a character, a result of recognition representing the character is output and stored in storage means 36; if the digital signal does not correspond to a recognized character within character recognition means 34, a result of recognition representing an unknown character, for example "?", is stored in storage means 36.

The above operation of the scanning with the image sensor and the character recognition is repeated, and the results of recognition are stored in the storage means 36 successively.

The results of recognition stored in storage means 36 are sent to table retrieving means 38 in the form of combinations of the results of recognition with respect to one character. Table retrieving means 38 determines whether or not the received combinations are located in recognition-result combination table 40. Combination table 40 stores permissible combinations of recognition results which are interpreted to be proper representations of the final result, e.g., the scanned character. Combination table 40 may be a memory look up table such as a ROM memory, or some other decoder circuit. If the received combinations are located in comb-nation table 40, the corresponding final result representing the determined character from surface 22 is read from combination table 40 to table retrieving means 38, and Final Result 42 is output from table retrieving means 38.

Figure 4:
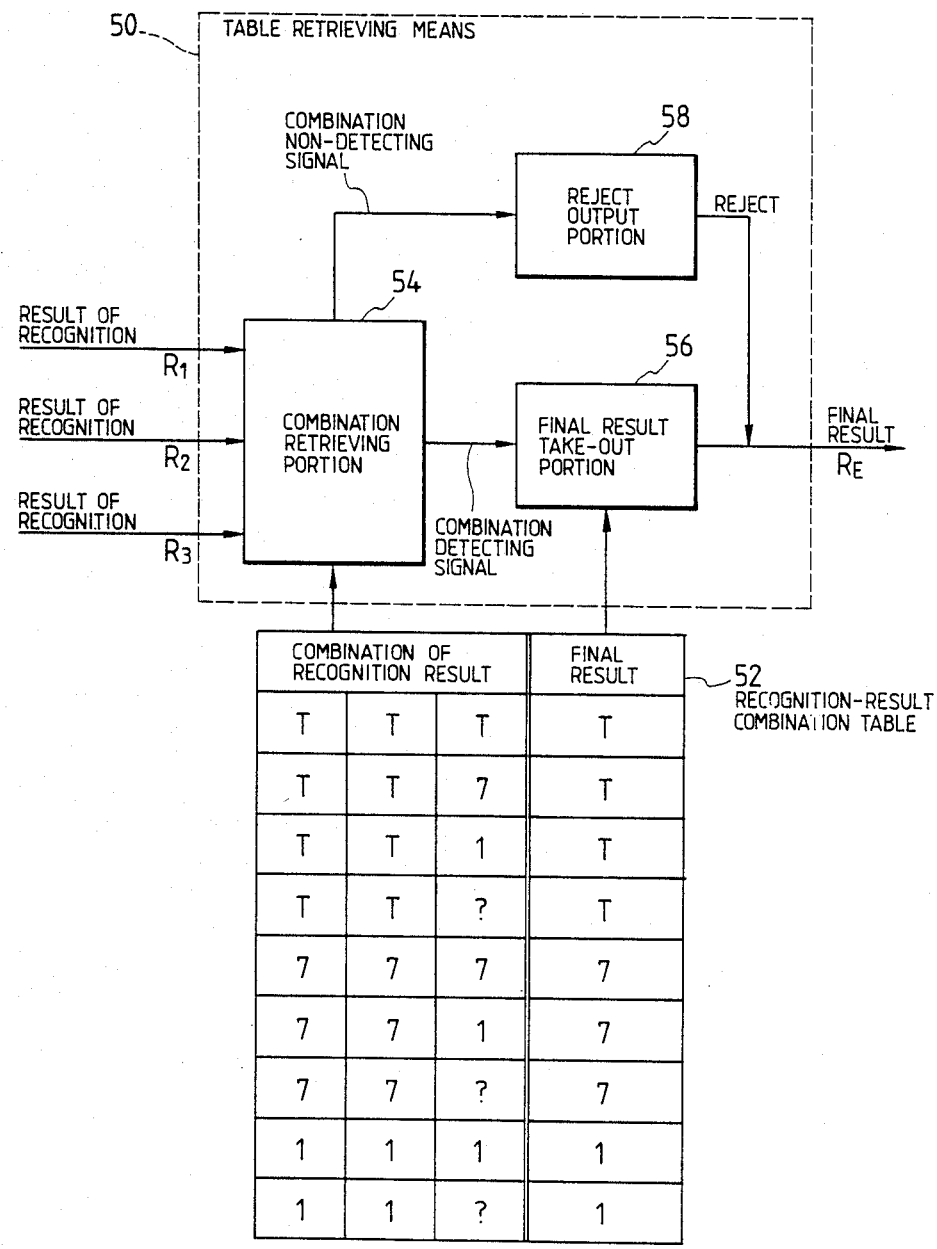
FIG. 4 is a block diagram of a first embodiment of the present invention.

FIG. 4 shows a first embodiment of the present invention. The drawing shows a part of the optical character reader including table retrieving means 50, which corresponds to table retrieving means 38 of FIG. 3, and recognition-result combination table 52 which form the features of the present invention.

FIG. 4 shows the portion in which a final result $R_E$ is obtained from results of recognition $R_1$, $R_2$, and $R_3$ obtained through recognition performed three times with respect to one character. A variation of this embodiment would be to perform more than three scans to provide more than three results of recognition.

A combination retrieving portion 54 executes retrieval from combination table 52 to determine whether the combinations of the results of recognition $R_1$, $R_2$, and $R_3$ received exist in combination table 52 (described later). If the received combination is located in combination table 52, combination retrieving portion 54 produces a combination detection signal; if the received combination is not found in combination table 52, combination retrieving portion 54 produces a combination non-detection signal.

Recognition-result combination table 52 shows combinations in the case where three characters "T", "7", and "1" are defined to be objects for recognition. Any unrecognizable characters are denoted in this case by the symbol "?". When there are any other kinds of characters which are objects to be recognized, the contents of the combination table 42 may be suitably increased, taking into consideration the tendency of erroneous reading.

In combination table 52, in the case where the combination of three results of recognition are T, T, and T, it is regarded that all of the three results show correct reading, so that the final result is determined to be T.

In the case of the combination of T, T, and 7, one result of recognition is different from the other two results of recognition. Combination table 52, which has taken into consideration the tendency of the erroneous reading of the character T, contains the pattern T, T, and 7. Consideration of the tendency of the erroneous reading may be carried out, for example, as follows: the probability that only one of the three results of recognition processing is caused by erroneously reading T as 7 is compared with the probability that two of the three results are caused by erroneously reading 7 as T; since the former result is more probable than the latter, the final result is determined to be T in this case.

Similarly, final results respectively corresponding to combinations of other results of recognition are included in combination table 52. The order of three results of recognition in one combination is not particularly limited.

The final result $R_E$ is determined in a manner as follows: upon reception of a combination detecting signal from combination retrieving portion 54, a final-result take-out portion 56 receives the final result corresponding to the combination of the results of recognition from recognition-result combination table 52 and outputs the taken-out final result as a final result $R_E$. For example, if the combination of T, T, and 7 is input into combination retrieving portion 54, the combination retrieving portion 54 makes a retrieval from the recognition-result combination table 52 to detect the very combination in the second row. The final-result take-out portion 56 reads the final result T in the second row and outputs the final result T.

Upon reception of a combination such as, for example, T, 7, and 1 which is not located in the recognition-result combination table 52, combination retrieving portion 54 outputs a combination non-detecting signal to a reject output portion 58, and the reject output portion 58 produces "REJECT" as a final output $R_E$.

Figure 5:
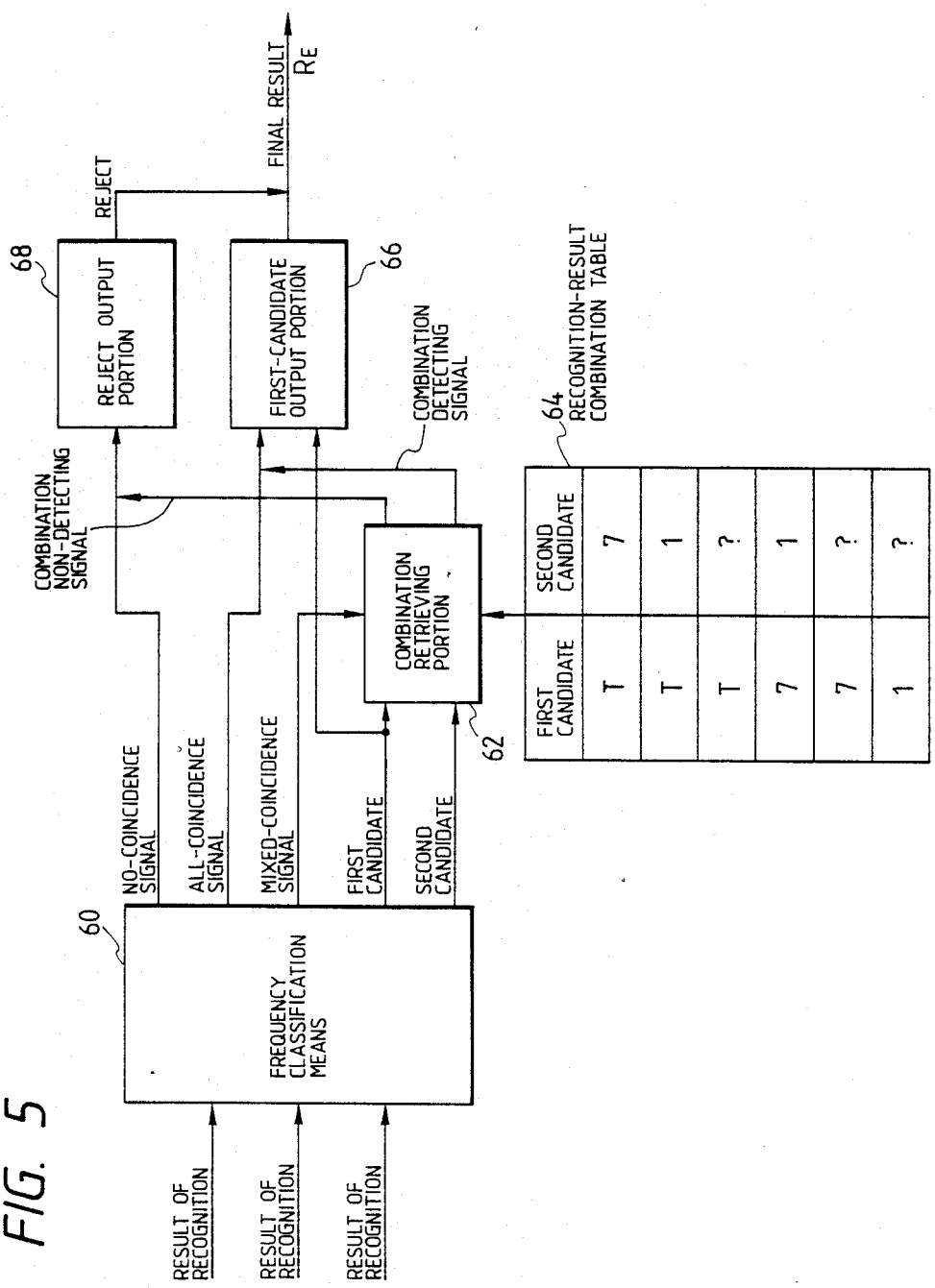
FIG. 5 is a block diagram of a second embodiment of the present invention.

FIG. 5 shows a second embodiment of the present invention. In this embodiment, the quantity of information in the recognition-result combination table is compressed more than in the embodiment described in FIG. 4 to reduce the required memory capacity.

A frequency classification means 60 is arranged to classify the contents of the three results of recognition applied thereto so that the frequency classification means 60 produces an all-coincidence signal when the three results of recognition are the same, a mixed-coincidence signal when two of the three results of recognition are the same and a no-coincidence signal when all three results of recognition are different. In the case where frequency classification means 60 generates an all-coincidence signal, the coincident result is defined as a first candidate, while in the case where frequency classification means 60 generates a mixed-coincidence signal, the results of majority (two) and the results of minority (one) are defined as a first candidate and as a second candidate, respectively.

Upon reception of the mixed-coincidence signal from the frequency classification means 60, a combination retrieving portion 62 receives the first and second candidates and retrieves the combination of those first and second candidates from a recognition-result combination table 64. The combination retrieving portion 62 produces a combination detection signal when the combination of the first and second candidates is located in combination table 64, while combination retrieving portion 62 produces a combination non-detection signal when the combination is not located in the combination table 64. Upon reception of the all-coincidence signal from the frequency classification means 60 or the combination detection signal from the combination retrieving portion 62, a first-candidate output portion 66 produces the first candidate as a final result $R_E$.

Upon reception of the no-coincidence signal from frequency classification means 60 or the combination non-detection signal from the retrieving portion 62, a reject output portion 68 generates "REJECT" and produces the "REJECT" as the final result $R_E$. In short, the result by majority is employed as the final result in the case where the three results of recognition coincide with each other and in the case where two of the three results of recognition coincide with each other and the combination the majority and minority is located in the combination table 53, while "REJECT" is made to be the final result $R_E$ in any other cases.

According to the present invention, one final result can be determined from a plurality of results of recognition taking into consideration the tendency of erroneous reading depending on kind of characters, so that the rate of erroneous reading in the optical character reading apparatus can be reduced, resulting in improvement in performance of the apparatus.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for reading a character from a surface comprising:
   a light source directed upon said surface;
   an image sensor for detecting during a scanning operation light directed from said surface, said image sensor outputting a signal in response to said light directed from said surface during said scanning operation;

recognition means, responsive to said signal, for determining a corresponding result of recognition during a scan from a predetermined set of recognizable characters; and character determining means for determining said character from said surface, responsive to a plurality of said results of recognition during a corresponding plurality of scans, said character determining means comprising:

combination storing means for outputting said character, said combination storing means storing only combinations of recognition predetermined to be possible representations of said character, and retrieving means for retrieving said character from said combination storing means when said plurality of results of recognition corresponds to one of said predetermined combinations of recognition.

2. An apparatus as recited in claim 1, wherein said plurality of results of recognition comprises a first, second and third result.

3. An apparatus as recited in claim 2, wherein said apparatus further comprises storage means, connected to said recognition means and said character determining means, for storing said plurality of results of recognition.

4. An apparatus as recited in claim 3, wherein:

said combination storing means includes a recognition-result combination table having a plurality of said predetermined combinations of recognition and a corresponding plurality of predetermined final results, each of said predetermined combinations of recognition being possible representations of said corresponding final result;

said retrieving means generates a combination detecting signal when said plurality of results of recognition corresponds to said one of said predetermined combinations of recognition and said retrieving means generates a combination non-detecting signal when said plurality of results of recognition does not correspond to one of said predetermined combinations of recognition; and said character determining means further comprises means for generating a reject signal in response to said combination non-detecting signal, and means for reading a final result from said recognition-result combination table in response to said combination detecting signal, and for outputting said character in response to said detected final result, said detected final result corresponding to said one of said predetermined combinations of recognition.

5. An apparatus as recited in claim 4, wherein each of said predetermined combinations of recognition having non-identical results of recognition is predetermined to have an erroneous result of recognition as a representation of said corresponding final result.

6. An apparatus as recited in claim 5, wherein said recognition means comprises:

a binary encoding circuit for converting said signal into a digital signal, said digital signal having a first and second state representing a respective white and black intensity of said light directed from said surface during said scan; and character recognition means responsive to said digital signal for determining each of said results of recognition during each corresponding scan from a predetermined set of recognizable characters.

7. An apparatus as recited in claim 3, wherein:

said combination storing means includes a recognition-result combination table having a corresponding plurality of first and second candidates as said combinations of recognition; and said character determining means further comprises:

frequency classification means, responsive to said plurality of results of recognition, for generating at least:

an all-coincidence signal when all of said plurality or results of recognition are equivalent;

a no-coincidence signal when one of said plurality of results of recognition are equivalent; and a mixed-coincidence signal, a first candidate signal and a second candidate signal when at least two of said plurality of results of recognition are equivalent, said first candidate signal representing a majority of equivalent results from said plurality of results of recognition, said second candidate signal representing a minority of equivalent results from said plurality of results of recognition, combination retrieving means, responsive to said mixed-coincidence signal and said first and second candidate signal, for determining an occurrence of a correlation of said first and second candidate signal to a detected first and second candidate from said recognition result combination table, respectively, said combination retrieving means generating a combination detection signal in responses to said occurrence, said combination retrieving means generating a non-detecting signal upon a failure to detect said occurrence.

8. An apparatus as recited in claim 7, wherein said character determining means further comprises:

first-candidate output means, responsive to said all-coincidence signal, said first candidate signal and said combination detecting signal, for outputting a final result corresponding to said character; and reject output means, responsive to said no-coincidence signal and said combination non-detecting signal, for outputting a reject signal.

9. An apparatus as recited in claim 8, wherein said recognition means comprises:

a binary encoding circuit for converting said first signal into a digital signal, said digital signal having a first and second state representing a respective white and black intensity of said light directed from said surface during said scan; and character recognition means responsive to said digital signal for determining each of said results of recognition during each corresponding scan from a predetermined set of recognizable characters.

10. In an apparatus for reading a first character from a surface, whereby said apparatus comprises an image sensor outputting a signal in response to light directed from said first character and recognition means responsive to said signal for determining a corresponding result of recognition during a scan, a method for determining said first character from a plurality of corresponding scans, the method comprising the steps of:

predetermining a majority lookup table, said predetermining step comprising the steps of:

determining a possibility that said first character may be erroneously read as a second character, and developing a combination of recognition corresponding to said first character, said combination comprising said first character and said second character, said second character having said possibility that said second character is an erroneous representation of said first character;

performing said plurality of scans to obtain a plurality of said corresponding results of recognition;

comparing said plurality of said results of recognition with said combination in said majority lookup table, said results of recognition corresponding to said plurality of scans; and outputting a final result as said first character from said majority table when said results of recognition correlate with said combination of results of recognition corresponding to said final result.

* * * * *